(12) United States Patent
McDuffee et al.

(10) Patent No.: US 8,560,775 B1
(45) Date of Patent: Oct. 15, 2013

(54) METHODS FOR MANAGING CACHE CONFIGURATION

(71) Applicant: STEC, Inc., Santa Ana, CA (US)

(72) Inventors: Joseph A. McDuffee, Irvine, CA (US); Saied Kazemi, Irvine, CA (US)

(73) Assignee: STEC, Inc., Santa Ana, CA (US)

( * ) Notice: Subject to any disclaimer, the term of this patent is extended or adjusted under 35 U.S.C. 154(b) by 0 days.

(21) Appl. No.: 13/631,463

(22) Filed: Sep. 28, 2012

(51) Int. Cl.
*G06F 12/00* (2006.01)
(52) U.S. Cl.
USPC ............................ 711/114; 711/118; 711/154
(58) Field of Classification Search
USPC .......................................... 711/114, 118, 154
See application file for complete search history.

(56) References Cited

U.S. PATENT DOCUMENTS

2012/0079195 A1* 3/2012 Bolen et al. .................... 711/114

* cited by examiner

*Primary Examiner* — Yong Choe
(74) *Attorney, Agent, or Firm* — Wilmer Cutler Pickering Hale and Dorr LLP

(57) ABSTRACT

Techniques for managing cache configuration are disclosed. In some embodiments, the techniques may be realized as a method for managing creation of nodes names and references to source devices during detection of storage devices (e.g., a physical devices such as a SCSI Disk, a redundant array of independent disks (RAID), or logical devices such as logical volume management (LVM) volumes or automatic storage management (ASM) volumes). Management of cache configuration may include creation of rules to generate node names upon detection of source and/or cache devices. Management of cache configuration also may include the creation of rules to create caches or initiate creation of caches upon successful creation of source devices and cache devices corresponding to a cache. Management of cache configuration may include management of the creation of symbolic links to a cache of a source device.

20 Claims, 5 Drawing Sheets

METHODS FOR MANAGING CACHE CONFIGURATION

BACKGROUND

Caching is the temporary storage of data for subsequent retrieval. Memory devices are often used to store data provided by a computer program. Examples of memory storage devices include, but are not limited to, solid-state drives, hard disk drives, and optical drives. These types of storage devices are inexpensive and hold large amounts of data. However, one tradeoff for their economic value is that they are slow compared to other components used in a computer. For example, a consumer hard drive can store terabytes of data cheaply, but has a maximum theoretical transfer rate of 300 megabytes (MB) per second. Random access memory (RAM) is faster in performance but higher in price, with a maximum theoretical transfer rate of 12.8 gigabytes (GB) per second. A central processing unit (CPU) with specialized memory known as level 1 (L1) cache or level 2 (L2) cache has even better performance, with a transfer rate of 16 GB per second, or over fifty times faster than the storage device, but at an even higher price.

Because computer components exhibit this tradeoff between price and performance, a technique known as caching may be used to increase, or accelerate, overall system performance. Caching may be used to store data requested from one component, into another component, to speed future requests for the same data. The data stored in a cache often may be values previously requested by a software application, by an operating system, or by another hardware component. Caching organizes a small amount of fast-access memory and a large amount of slow-access memory. The first time that a value is requested, the data is not in the cache, so the requested value is retrieved from the slow-access memory. In a cache, when the value is retrieved from the slow-access memory, the value is sent to the component that requested it, and the value also is stored in the fast-access memory for future requests. The next time that the same value is requested by the operating system or by any other program, the value is retrieved from the fast-access memory, with the result that the overall system performance is faster, or accelerated, by virtue of the value being available from the fast-access memory. By using faster memory components to cache data, more requests can be served from the cache instead of the slower storage device, and faster overall system performance can be realized.

However, interruption of devices storing data may result in the renaming of such devices upon resumption of service. For example, source devices (e.g., sources of cached data) such as Small Computer System Interface (SCSI) devices may be assigned a new node name after a reboot of a host system. Caching of such devices should be updated to reflect the new node name. Additionally, software using such caching also can be updated.

SUMMARY OF THE DISCLOSURE

Techniques for managing cache configuration are disclosed. In some embodiments, the techniques may be realized as a method for managing creation of nodes names and references to source devices during detection of storage devices (e.g., a physical devices such as a SCSI Disk, a redundant array of independent disks (RAID), or logical devices such as logical volume management (LVM) volumes or automatic storage management (ASM) volumes). Management of cache configuration may include creation of rules to generate node names upon detection of source and/or cache devices. Management of cache configuration also may include the creation of rules to create caches or initiate creation of caches upon successful creation of source devices and cache devices corresponding to a cache. Management of cache configuration may include management of the creation of symbolic links to a cache of a source device.

In accordance with further aspects of the present disclosure, the techniques for cache configuration management may include suppression of node naming for source devices. Node name creation may be suppressed for source devices that are configured for caching and attempted node names may be recorded. Creation of symbolic link names for source devices that are configured for caching may be suppressed and attempted symbolic link names may be recorded. After detection of a corresponding device and reassembly of a cache for a device with a suppressed node name or symbolic link, the suppressed node name may be created and configured to refer to the cache. Similarly, once a cache is enabled for a source device, suppressed symbolic links referring to the source device may be created and configured to refer to the cache of the source device. Suppression of node name creation and symbolic link or other reference creation for source devices may be timed to occur prior to the execution of initialization and/or startup scripts. Creation of node names and/or symbolic links pointing to a cache of the source device may also occur prior to the execution of initialization and/or startup scripts.

In some embodiments, the techniques may further include notifying an administrator in the event that detection of a cache component fails. For example, if a source device or a cache device is not detected an administrator may be notified.

According to another aspect of the disclosure, if detection of a cache device fails, a cache may be enabled in a degraded mode. In a cache degraded mode requests for data from cache may be directed to the source device. If a cache device is subsequently detected, cache may be enabled and requests for data may be handled by the cache device. According to some embodiments, cache may be flushed prior to enablement. Cache management software may determine if a corresponding source device has been active during a period of cache degraded mode operation. If a source device (e.g., a SCSI disk) has been active during a period of degraded cache operation, cache may be flushed upon subsequent restoration of the corresponding cache device.

According to some embodiments, if a cache fails, suppressed node names or symbolic links may be mapped to a source device.

According to one or more embodiments, upon detection of a solid state device, cache management software of a source device may verify that a storage size of the source device is the same as a prior failed cache device.

According to some embodiments, cache management software may receive an indication of a partition on a solid state device to use for caching, a storage size indication, or another indicator of an available amount of cache space on a solid state device. Cache management software of a source device may adjust an amount of data cached according to an amount of cache space available on a detected solid state device. According to some embodiments, cache management software may identify an amount of storage space available on a detected solid state device and may adjust an amount of data cached according to the amount of cache space available on the detected solid state device.

In some embodiments, a host device containing a source device may include at least one of: an enterprise server, a database server, a workstation, a computer, a mobile phone, a game device, a personal digital assistant (PDA), an email/text messaging device, a digital camera, a digital media (e.g., MP3) player, a GPS navigation device, and a TV system.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DESCRIPTION

Figure 1:
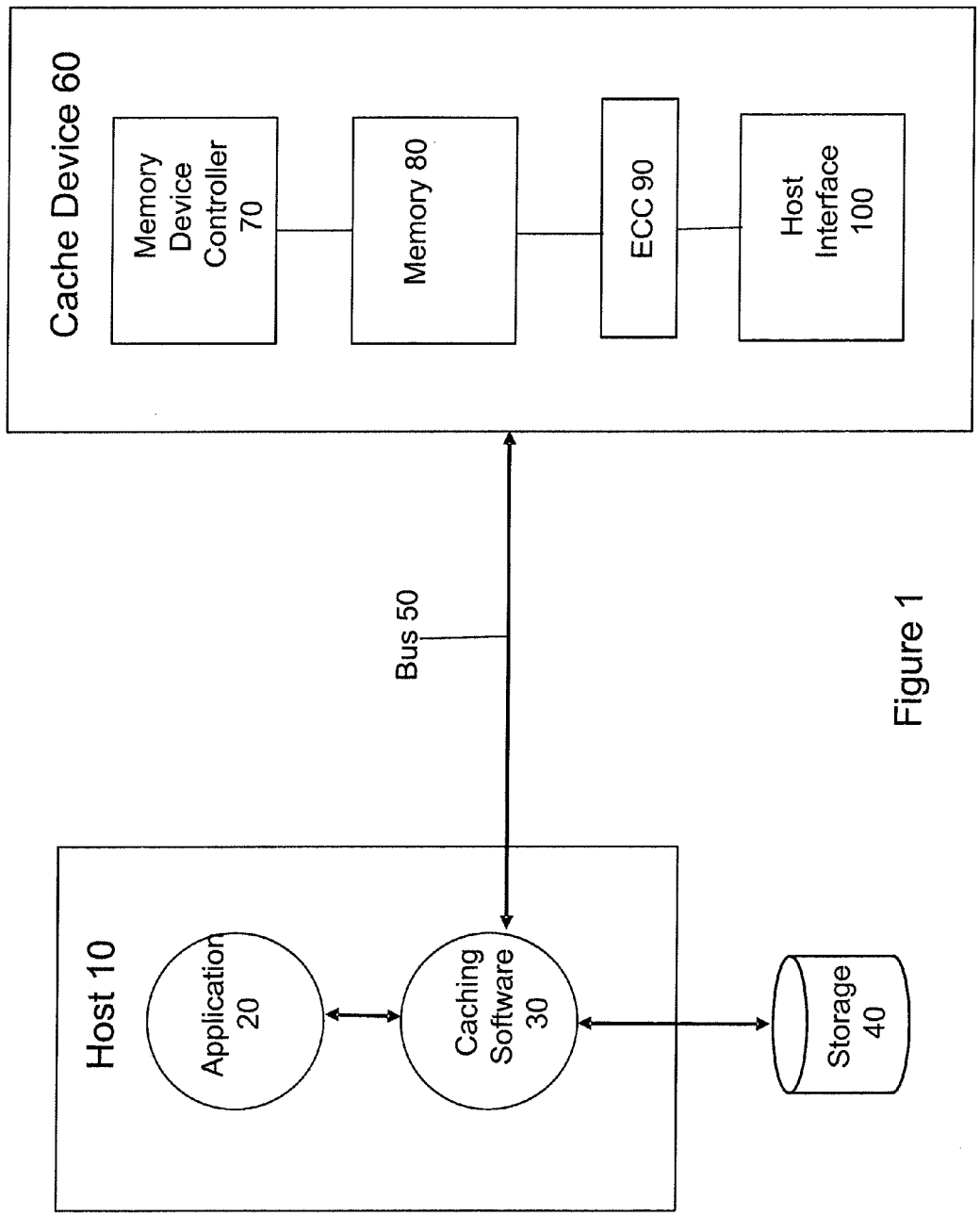
FIG. 1 shows an exemplary block diagram depicting a solid state device in communication with a host device, in accordance with an embodiment of the present disclosure.

The present disclosure relates to management of cache configuration. The cache configuration management may include creation of scripts to reduce inconsistent naming of source devices and/or cache devices. Cache configuration management also may include suppression of node naming of detected cached devices and symbolic linking to detected cached devices. Cache management may include mapping of node names and symbolic links for cached devices to corresponding caches of the cached devices. When a device is detected by a device manager of a host system (e.g., a SCSI disk or a Solid State Device (SSD) is connected or powered on) the device manager will assign a node name to the detected device. Node names may be assigned on an inconsistent basis (e.g., based upon which port of a host device a detected device is plugged into) and may change. For example, when the Linux kernel detects block devices, such as SCSI disks, they are given device node names under the /dev path that can be used to access the device. However, these assigned nodes names (e.g. sda, sdb, etc.) are transient and are not guaranteed to be the same device (i.e. persistent) across system reboots. This means that cache configurations cannot be saved using these transient names because the cache might be assembled using the wrong device on the next system boot. According to embodiments of this disclosure unique identifiers (e.g. Universally Unique Identifier (UUID), disk serial ID, etc) of a device are used in device manager scripts or executables to provide persistent device configuration to address this problem. Because scripts or other executables may fire upon detection of a device, these scripts may be used to ensure a consistent node name is assigned based on a unique identifier of a detected device. This consistent node name may ensure reliable configuration of a cache, reliable configuration of applications dependent on a node name or cache (e.g., a database configured to use a SCSI disk based on the node name or the cache), and other benefits.

In addition, while persistent device configuration may ensure that the correct devices are used during cache assembly irrespective of their transient names (e.g., default node names assigned by a device manager), even with persistent device configuration a cache device (e.g., an SSD) may still be a tertiary device (e.g. /dev/mapper/<cache_name>). Unfortunately, this may require a system or an application configuration to be modified in order to take advantage of a cache. This reconfiguration may be cumbersome. According to aspects of the disclosure, reconfiguration of applications and or systems to use cache may be avoided by using transparent cache naming. Transparent cache naming may assume control of an original source device node and one or more of its symbolic links. Symbolic links (or other file system entries which reference another file or a directory via an absolute or relative path) may be used by systems or applications to reference a device. For example, a database may use a symbolic link to a storage device to allow it to access the storage device. By assuming control of a source device node and corresponding symbolic links, transparent cache naming may reconfigure a node name and one or more symbolic links to point to a cache of the source device instead of the source device. Such reconfiguration can be transparent to an application and/or a system and may allow an application or system to realize the benefit of caching without the burden of reconfiguration.

Transparent cache naming may suppress the creation of node names and/or symbolic links until a cache is assembled. This may allow the node names and/or symbolic links to be created referring to the cache instead of a source device. For example, if a source device (e.g., a SCSI disk) is detected, creation of a node name referring to that source device may be suppressed if that source device is configured to be cached. Once a cache device is detected (e.g., an SSD), the cache for the source device may be assembled and a node name and/or one or more symbolic links may be created and configured to refer to the cache.

Cache configuration management techniques also may include receiving, at a host device, notification of a detected solid state device. In response to detection of the solid state device, the solid state device may be initialized. Upon initialization, a cache mode may be set to cached. In a cached mode, input/output requests may be directed to the solid state device. Cache configuration management techniques are discussed in further detail below.

Turning now to the drawings, FIG. 1 is an exemplary block diagram depicting a solid state device in communication with a host device, in accordance with an embodiment of the present disclosure. FIG. 1 includes a number of computing technologies such as a host 10, application 20, caching software 30, a bus 50, a cache device 60, a memory device controller 70, a memory 80, an Error Correcting Code (ECC) memory block 90, and a host interface 100. The bus 50 may use suitable interfaces standard including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), Universal Flash Storage (UFS) and Peripheral Component Interconnect Express (PCIe).

As used herein, the phrase "in communication with" means in direct communication with or in indirect communication with via one or more components named or unnamed herein (e.g., a memory card reader). The host 10 and the cache device 60 can be in communication with each other via a wired or wireless connection and may be local to or remote from one another. According to some embodiments, the cache device 60 can include pins (or a socket) to mate with a corresponding socket (or pins) on the host 10 to establish an electrical and physical connection. According to other embodiments, the cache device 60 includes a wireless transceiver to place the host 10 and cache device 60 in wireless communication with each other.

The host 10 can take any suitable form, such as, but not limited to, an enterprise server, a database host, a workstation, a personal computer, a mobile phone, a game device, a personal digital assistant (PDA), an email/text messaging device, a digital camera, a digital media (e.g., MP3) player, a GPS navigation device, and a TV system. The cache device 60 can also take any suitable form, such as, but not limited to, a universal serial bus (USB) device, a memory card (e.g., an SD card), a hard disk drive (HDD), a solid state device (SSD), and a redundant array of independent disks (RAID). Also, instead of the host device 10 and the cache device 60 being separately housed from each other, such as when the host 10 is an enterprise server and the cache device 60 is an external card, the host 10 and the cache device 60 can be contained in the same housing, such as when the host 10 is a notebook computer and the cache device 60 is a hard disk drive (HDD) or solid-state device (SSD) internal to the housing of the computer.

As shown in FIG. 1, the host 10 can include application 20 and caching software 30. In general, application 20 may reside on host 10 or remote from host 10. Application 20 may request data from caching software 30. Caching software 30 may be configured to send input/output (I/O) requests to cache device 60 via the bus 50. Caching software 30 may direct input/output (I/O) requests for data not stored on cache device 60 to storage 40. The memory 80 stores data for use by the host 10. The cache device 60 contains a host interface 100, which is configured to receive commands from and send acknowledgments to the host 10 using the interface standard appropriate for the bus 50. The cache device 60 may also contain a memory device controller 70 operative to control various operations of the cache device 60, an optional Error Correcting Code (ECC) memory block 90 to perform ECC operations, and the memory 80 itself.

The memory 80 can take any suitable form, such as, but not limited to, a solid-state memory (e.g., flash memory, or solid state device (SSD)), optical memory, and magnetic memory. While the memory 80 is preferably non-volatile, a volatile memory also can be used. Also, the memory 80 can be one-time programmable, few-time programmable, or many-time programmable. In one embodiment, the memory 80 takes the form of a raw NAND die; however, a raw NOR die or other form of solid state memory can be used.

The host 10 and the cache device 60 can include additional components, which are not shown in FIG. 1. Also, in some embodiments, not all of the components shown are present. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

Storage 40 may utilize a redundant array of inexpensive disks ("RAID"), magnetic tape, disk, Direct-attached storage (DAS), a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage.

Caching software 30 may receive I/O requests from application 20 and may forward requests for cached data to cache device 60 and may return retrieved data. Caching software 30 may forward I/O requests for uncached data to storage 40 and may return retrieved data. According to some embodiments, caching software 30 may implement one or more caching algorithms to improve cache performance. For example, caching software 30 may implement one or more of a Least Recently Used (LRU) algorithm, a Least Frequently Used (LFU) algorithm, a Most Recently Used algorithm, or another caching algorithm.

Figure 2:
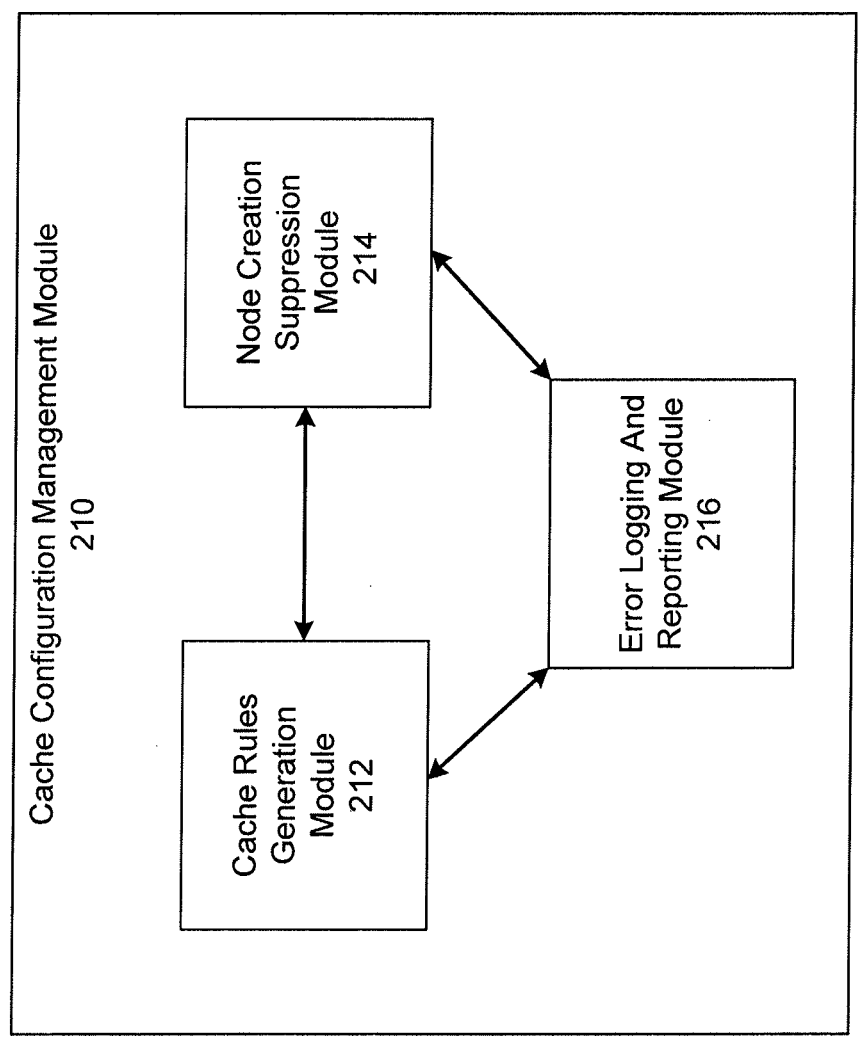
FIG. 2 depicts an exemplary module for managing cache configuration, in accordance with an embodiment of the present disclosure.

FIG. 2 depicts an exemplary module for handling caching during solid state device failure, in accordance with an embodiment of the present disclosure. As illustrated in FIG. 2, cache configuration management module 210 may contain cache rules generation module 212, node creation suppression module 214, and error logging and reporting module 216. Modules may be integrated and/or combined in one or more manners. For example, cache rules generation module 212, node creation suppression module 214, and error logging and reporting module 216 may be subsets of functionality of cache configuration management module 210, separate classes instantiated by cache configuration management module 210 or otherwise integrated. One or more modules may be implemented as part of cache software 30 in FIG. 1 above.

Cache rules generation module 212 may generate rules for naming source devices, cache devices, and caches. Cache rules generation module 212 manages the creation of node names during detection of source devices (e.g., a physical devices such as a SCSI Disk, a redundant array of independent disks (RAID), or logical devices such as logical volume management (LVM) volumes or automatic storage management (ASM) volumes). Cache rules generation module 212 generates rules for node names during initial configuration of cache. Rules created by cache rules generation module 212 may be executed during startup of a source device or a cache device in response to detection of such a device. For example, in Linux embodiments cache rules generation module 212 may generate a udev rules file under /etc/udev/rules.d. To generate a rule for a source device cache rules generation module 212 may first determine a type of device and a corresponding unique identifier for the device. Cache rules generation module 212 may contain rules mapping an expected identifier type to a device type so that once a device type is detected, cache rules generation module 212 may determine what identifier type to look for. Exemplary identifier types may include a Universally Unique Identifier (UUID), a Global Unique Identifier, a Media Access Control (MAC) address, a serial number, or another unique identifier. Once a device is detected and a device type is identified, a unique identifier may be determined. Cache rules generation module 212 may use the unique identifier in generation of a rule so that upon detection of a device, cache rules generation module 212 may determine whether the rule applies to the device. If a rule applies to the device based on a matched identifier, the rule executes. Cache rules generation module 212 may also assign node names, symbolic links, and/or other references on a partition basis. For example, individual partitions may be mapped separately to cache and/or assigned independent node names and symbolic links.

Cache rules generation module 212 creates rules for source devices, cache devices, and logical volumes as well as rules for the creation of a cache associating a source device with a cache device. Cache rules generation module 212 also may create symbolic links, soft links, shortcuts, or other logical references to a source device, a cache device, a partition of a cache device, and/or a logical volume.

Node creation suppression module 214 may suppress node naming for source devices. Node name creation may be suppressed for source devices that are configured for caching and attempted node names may be recorded. Creation of symbolic link names for source devices that are configured for caching may be suppressed and attempted symbolic link names may be recorded. Node creation suppression module 214 may provide recorded suppressed node names, symbolic links, and/or references to cache rules generation module 212. After detection of a corresponding device and reassembly of a cache for a node with a suppressed node name or symbolic link, rules created by cache rules generation module 212 may execute and may generate node names and/or symbolic links pointing to a cached version of the device.

Suppression of node name creation and symbolic link creation for host devices may be timed to occur prior to the execution of initialization and/or startup scripts. Creation of node names and/or symbolic links pointing to a cache of the host device may also occur prior to the execution of initialization and/or startup scripts. Suppression of node name and symbolic link creation may prevent the creation of references to a source device and allow such references to be redirected to point to cache of the corresponding source device. This may permit redirection of applications to cache devices without requiring application configuration. Such redirection may occur prior to startup scripts for applications or systems and may be transparent to applications and systems.

Error logging and reporting module 216 may handle one or more errors during rules generation, execution of rules, and/or node creation suppression. Error logging and reporting module 216 may notify an administrator in the event that detection of a cache component fails. For example, if a source device or a cache device is not detected an administrator may be notified via email, a text or short message service (SMS) message, a web posting, or other electronic communication. In some embodiments, options may be provided in a notification such as enablement of a cache in degraded mode, specification of a replacement cache, shutdown of one or more devices, and/or reboot of one or more devices. For example, if a source device or a cache device is not detected an administrator may be notified. Error logging and reporting module 216 may log events, escalate events, calculate statistics, and/or facilitate the identification of trends. Error logging and reporting module 216 may provide a command line interface, a scripting interface, and/or a graphical user interface (GUI) to facilitate troubleshooting and response to issues.

Figure 3:
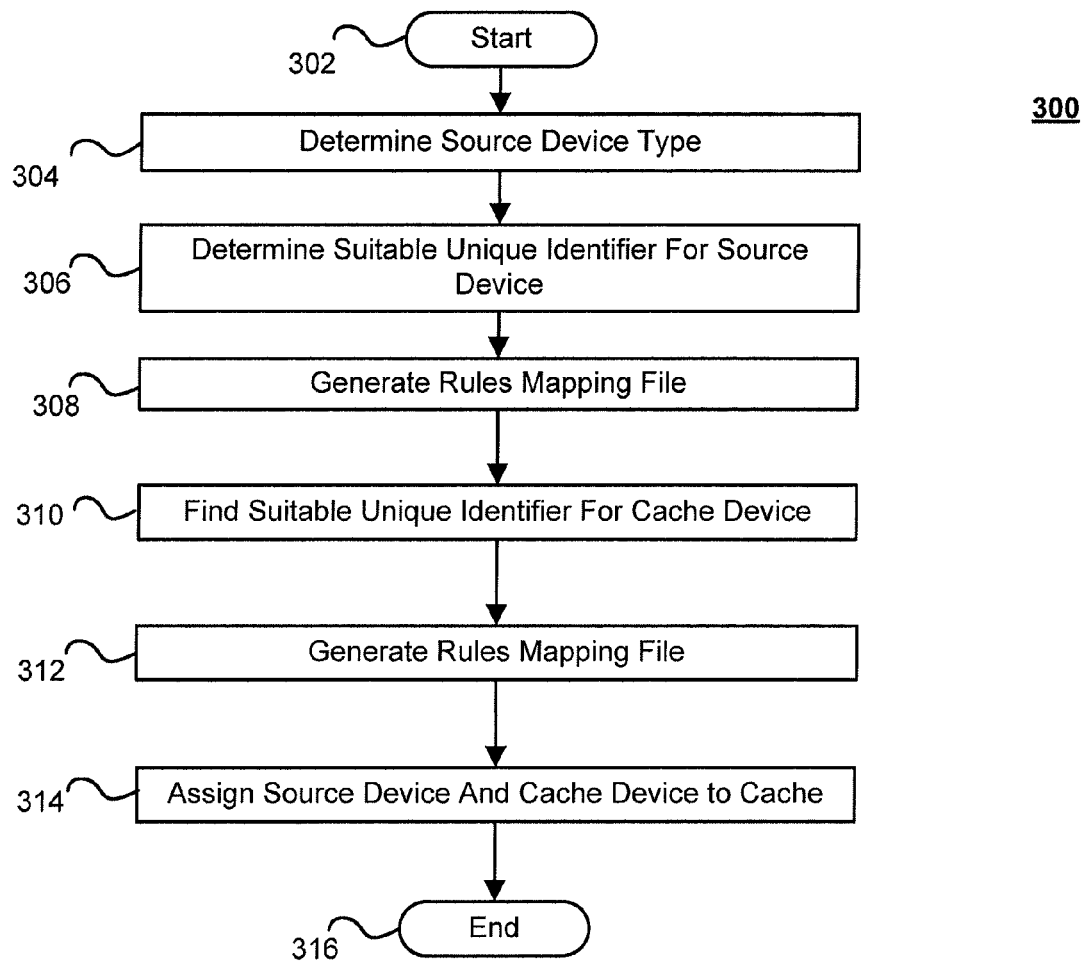
FIG. 3 depicts a flowchart illustrating cache configuration during cache creation, in accordance with an embodiment of the present disclosure.

FIG. 3 depicts a flowchart illustrating cache configuration during cache creation, in accordance with an embodiment of the present disclosure. The process 300, however, is exemplary. The process 300 can be altered, e.g., by having stages added, changed, removed, or rearranged. At stage 302, the process may begin.

At stage 304, a source device type may be determined. Source devices may include storage devices (e.g., a physical devices such as a Solid State Device (SSD), a SCSI Disk, a redundant array of independent disks (RAID), or logical devices such as logical volume management (LVM) volumes or automatic storage management (ASM) volumes).

At stage 306, a suitable unique identifier may be determined for a source device. The determination of a unique identifier may be based in part on the type of source device. Rules may be applied to map specify an expected identifier type to a device type once a device type is detected. Exemplary identifier types may include a Universally Unique Identifier (UUID), a Global Unique Identifier, a Media Access Control (MAC) address, a serial number, or another unique identifier. Once a device is detected and a device type is identified, a unique identifier may be determined.

At stage 308, rules mapping files are generated. A unique identifier may be used in generation of a rule so that upon detection of a device it may be determined whether the rule applies to the device. For example, caching software 30 of FIG. 1 may determine whether a rule applies to a detected device. Rules created may be executed during startup of a source device in response to detection of such a device. For example, in Linux embodiments a udev rules file may be generated under /etc/udev/rules.d. Rules may include rules to generate node names upon detection of source and/or cache devices. Rules may also include rules to create caches or initiate creation of caches upon successful creation of source devices and cache devices corresponding to a cache. Rules may further be generated for the creation of symbolic links or other references to a cache of a source device.

At stage 310, a suitable unique identifier may be determined for a cache device (e.g., a SSD). The determination of a unique identifier may be based in part on the type of cache device. Rules may be applied to map specify an expected identifier type to a device type once a device type is detected. Exemplary identifier types may include a Universally Unique Identifier (UUID), a Global Unique Identifier, a Media Access Control (MAC) address, a serial number, or another unique identifier. Once a device is detected and a device type is identified, a unique identifier may be determined.

At stage 312, a unique identifier may be used in generation of a rule so that upon detection of a device it may be determined whether the rule applies to the device. Rules created may be executed during startup of a cache device in response to detection of such a device. For example, in Linux embodiments a udev rules file may be generated under /etc/udev/rules.d. Rules may include rules to generate node names upon detection of source and/or cache devices. Rules may also include rules to create caches or initiate assembly of caches upon successful detection of source devices and cache devices corresponding to a cache. Rules may further be generated for the creation of symbolic links or other references to a cache of a source device.

At stage 314, a source device and a cache device may be assigned to a cache. According to some embodiments, rules may be generated so that a cache device and a source device assigned to a cache are assigned upon subsequent reboots of a system.

At stage 316, the method 300 may end.

Figure 4:
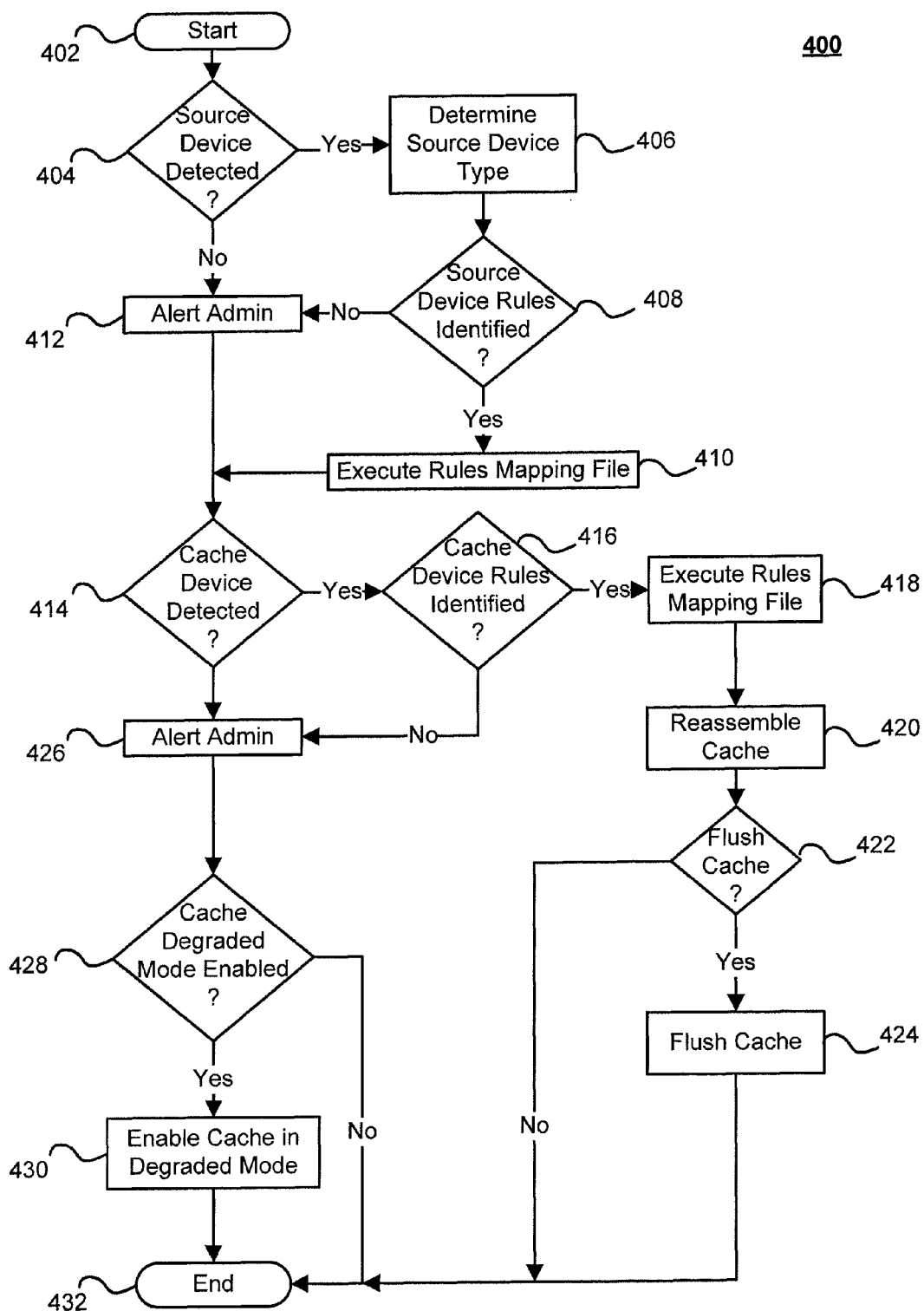
FIG. 4 depicts a flowchart illustrating cache configuration during resumption of a host device, in accordance with an embodiment of the present disclosure.

FIG. 4 depicts a flowchart illustrating management of cache configuration, in accordance with an embodiment of the present disclosure. The process 400, however, is exemplary. The process 400 can be altered, e.g., by having stages added, changed, removed, or rearranged. At stage 402, the process 400 may start.

At stage 404, it may be determined whether a source device is detected. Events may fire under a device manager of an operating system (e.g., Linux, Windows™, Vmware™, Mac OS X™, Solaris™, or other platforms). Cache management software may detect cache device status changes or receive notifications of such changes. For example, cache management software may detect or receive notification of a cache device failure or a cache device coming online. A Small Computer System Interface (SCSI) notifier function or a fibre channel Registered State Change Notification (RSCN) may fire. Cache management software may implement a device notifier handler to react to such events.

According to some embodiments, an alternative or an additional notification mechanism may be implemented. A device manager subsystem may be notified when a device is added or removed. For example, in a Linux™ implementation a udev subsystem may be notified via a netlink socket. Scripts or other executable code may be triggered in response to the device manager notification which notify cache management software.

If a source device is not detected the process 404 may continue at stage 412. If a source device is detected the process 404 may continue at stage 406.

At stage 406, a source device type may be determined (e.g., a disk, a logical volume, etc.). According to some embodiments, subsystems of an operating system may determine this and may present device type information to cache management software (e.g., as part of a subscribed notification, an event, or other information available from a device manager).

At stage 408, it may be determined whether source device rules are present for the detected source device. A device type may determine what identifier type to look for. Exemplary identifier types may include a Universally Unique Identifier (UUID), a Global Unique Identifier, a Media Access Control (MAC) address, a serial number, or another unique identifier. Once a device is detected and a device type is identified, a unique identifier may be determined. If a rule contains an identifier matching an identifier of the device the process 400 may continue at stage 410. If a rule is not found containing a matched identifier for a source device, according to some embodiments, the process 400 may end at stage 432. According to some embodiments, if a source device is detected for which no rules are identified the process 400 may continue at stage 412.

At stage 410, rules matching a source device may be executed (e.g., a node name may be created for the source device).

At stage 412, an administrator may be notified. An administrator may be notified via email, a text or short message service (SMS) message, a web posting, or other electronic communication. In some embodiments, options may be provided in a notification such as enablement of a cache in degraded mode, specification of a replacement cache, shutdown of one or more devices, and/or reboot of one or more devices.

At stage 414, it may be determined whether a cache device is detected (e.g., an SSD). If a cache device is detected, the process 400 may continue at stage 416. If a cache device is not detected, the process 400 may continue at stage 426.

At stage 416, it may be determined whether cache device rules are present for the detected cache device. A device type may determine what identifier type to look for. Exemplary identifier types may include a Universally Unique Identifier (UUID), a Global Unique Identifier, a Media Access Control (MAC) address, a serial number, or another unique identifier. Once a device is detected and a device type is identified, a unique identifier may be determined. If a rule contains an identifier matching an identifier of the device the process 400 may continue at stage 418. If a rule is not found containing a matched identifier for a cache device, according to some embodiments, the process 400 may end at stage 432. According to some embodiments, if a cache device is detected for which no rules are identified the process 400 may continue at stage 426.

At stage 418, rules matching a cache device may be executed (e.g., a node name may be created for the cache device).

At stage 420, cache corresponding to the detected source and cache device may be reassembled and enabled.

At stage 422, it may be determined whether cache should be flushed. A determination may depend on one or more factors including, but not limited to: a type of cache (e.g., read only, write through, write back), a user preference, a length of downtime of a cache, a size of cache, and a projected length of time to synchronize a cache with a source device upon restoration of a cache. According to some embodiments, cache management software may read an indicator or flag which may indicate whether a source device has been enabled without the corresponding cache device (e.g., during a prior boot-up a source device started and was accessed, but the cache device failed to start). Such an indicator may be an indicator of stale data and may suggest flushing cache. If cache is to be flushed or initialized as cold cache, the process 400 may continue at stage 424. If cache is not to be initialized as cold cache or flushed, the process 400 may end at stage 432.

At stage 426, if either a cache device is not detected or rules for a cache device are not found, an administrator may be notified or another corrective action may be performed. An administrator may be notified via email, a text or short message service (SMS) message, a web posting, or other electronic communication. In some embodiments, options may be provided in a notification such as enablement of a cache in degraded mode, specification of a replacement cache, shutdown of one or more devices, and/or reboot of one or more devices.

At stage 428, it may be determined whether a cache is to be enabled in a degraded mode. In a degraded mode, requests for data may be redirected by cache management software to a source device. If cache is to be enabled in a degraded mode, the process 400 may continue at stage 430. If cache is not to be enabled the process 400 may end at stage 432.

At stage 430, cache may be enabled in a degraded mode.

At stage 432, process 400 may end.

Figure 5:
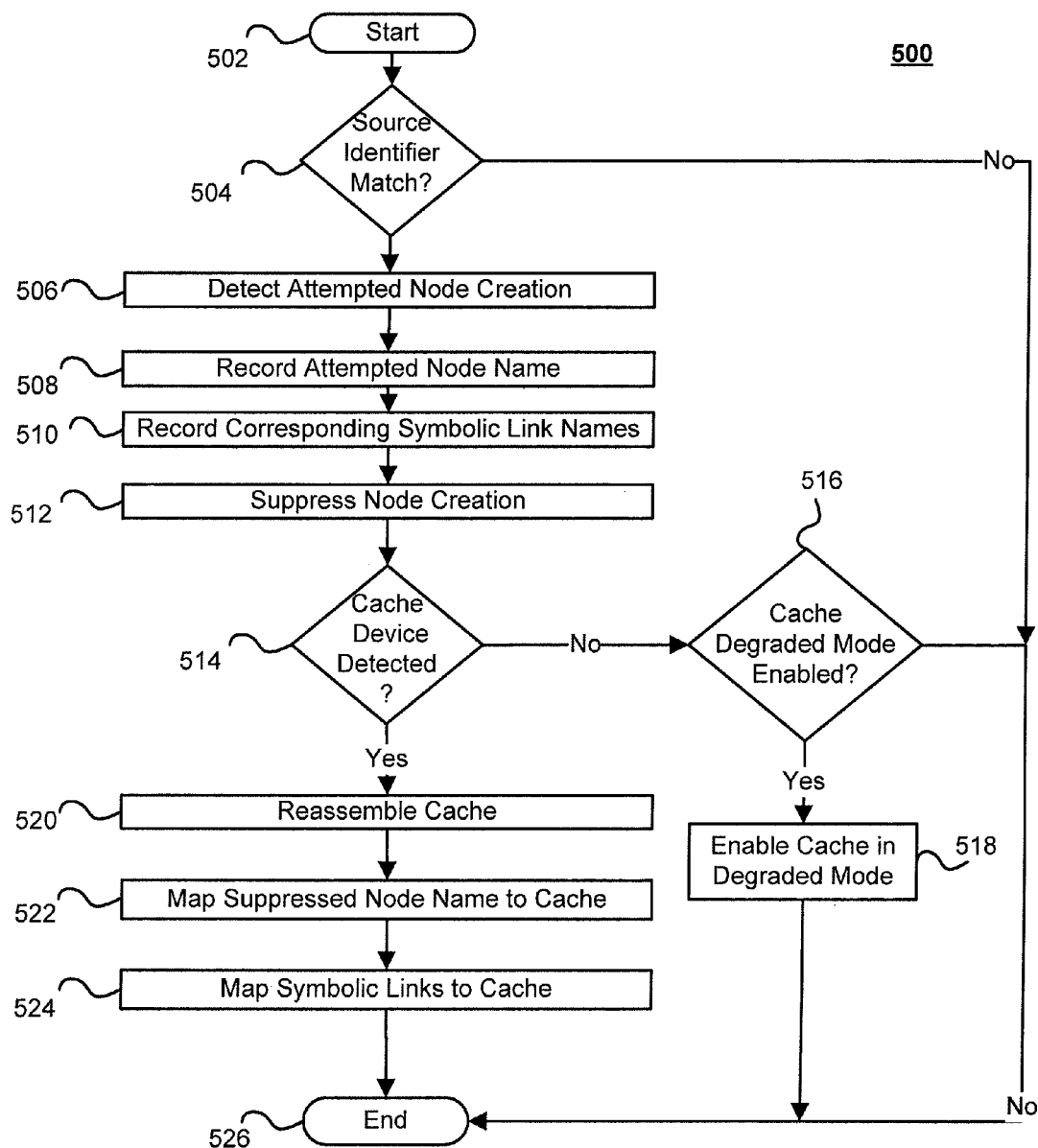
FIG. 5 depicts a flowchart illustrating management of cache configuration during resumption of a host device, in accordance with an embodiment of the present disclosure.

FIG. 5 depicts a flowchart illustrating management of cache configuration during resumption of a host device, in accordance with an embodiment of the present disclosure. The process 500, however, is exemplary. The process 500 can be altered, e.g., by having stages added, changed, removed, or rearranged. At stage 502, the process 500 may start.

At stage 504, it may be determined whether source device rules are present for the detected source device. A device type may determine what identifier type to look for. Exemplary identifier types may include a Universally Unique Identifier (UUID), a Global Unique Identifier, a Media Access Control (MAC) address, a serial number, or another unique identifier. Once a device is detected and a device type is identified, a unique identifier may be determined. If a rule contains an identifier matching an identifier of the device the process 500 may continue at stage 506. If a rule is not found containing a matched identifier for a source device, according to some embodiments, the process 500 may end at stage 526.

At stage 506, an attempted node creation may be detected.

At stage 508, the attempted node name may be recorded.

At stage 510, attempted creation of any corresponding symbolic links or other references to a source device may be detected and recorded.

At stage 512, node name creation and symbolic link or other reference creation may be suppressed. Suppression of node name creation and symbolic link creation for source devices may be timed to occur prior to the execution of initialization and/or startup scripts. Thus suppression of node names, symbolic links, or other references may not affect operation of an application and/or system configured to use such a node name, symbolic link, and/or reference.

At stage 514, it may be determined whether a cache device is detected (e.g., an SSD). If a cache device is detected, the process 500 may continue at stage 520. If a cache device is not detected, the process 500 may continue at stage 516.

At stage 516, it may be determined whether a cache is to be enabled in a degraded mode. In a degraded mode, requests for data may be redirected by cache management software to a source device. If cache is to be enabled in a degraded mode, the process 500 may continue at stage 518. If cache is not to be enabled the process 500 may end at stage 526.

At stage 518, cache may be enabled in a degraded mode.

At stage 520, cache corresponding to the detected source and cache device may be reassembled and enabled in a normal cache mode.

At stage 522, after detection of a corresponding source device and reassembly of a cache for a node with a suppressed node name or symbolic link, the suppressed node name may be created and configured to refer to the cache.

At stage 524, once a cache is enabled for a source device, suppressed symbolic links and/or other references referring to the source device may be created and configured to refer to the cache of the source device. Creation of node names and/or symbolic links pointing to a cache of the source device may occur prior to the execution of initialization and/or startup scripts. At stage 526, the method 500 may end.

Other embodiments are within the scope and spirit of the invention. For example, the functionality described above can be implemented using software, hardware, firmware, hardwiring, or combinations of any of these. One or more computer processors operating in accordance with instructions may implement the functions associated with managing cache configuration in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing a cache configuration comprising:
   determining a first unique identifier for a storage device;
   creating a first rule to generate a first node name upon detection of the storage device having the first unique identifier;
   determining a second unique identifier for a cache device;
   creating a second rule to generate a second node name upon detection of the cache device having the second unique identifier;
   creating a third rule to generate a cache of the storage device using the cache device;
   detecting, using a computer processor, a device and verifying the identity of the device using a unique identifier associated with the device;
   in the event the storage device is detected, executing the first rule to generate the first node name;
   in the event the cache device is detected, executing the second rule to generate the second node name; and
   in the event the first node name and the second name exist, executing the third rule to generate the cache of the storage device using the cache device.

2. The method of claim 1, wherein the unique identifier comprises at least one of: a Universally Unique Identifier (UUID), a Global Unique Identifier, a Media Access Control (MAC) address, and a serial number.

3. The method of claim 1, wherein the identity of the device is further verified by a device type.

4. The method of claim 1, wherein the identity of the device is further verified by a partition number.

5. The method of claim 1, wherein the identity of the device is further verified by a volume identifier.

6. The method of claim 1, wherein the storage device comprises at least one of: a Small Computer System Interface (SCSI) Disk, a hard disk, a redundant array of independent disks (RAID), and a logical volume.

7. The method of claim 1, wherein the cache device comprises a Solid State Device (SSD).

8. The method of claim 1, wherein in the event the storage device is not detected an administrator is notified.

9. The method of claim 1, wherein in the event the cache device is not detected an administrator is notified.

10. The method of claim 1, wherein in the event the cache device is not detected and the storage device is detected, the cache is enabled in a degraded mode.

11. The method of claim 10, further comprising:
    detecting the cache device subsequent to enablement of the cache in degraded mode; and
    enabling the cache in a normal mode.

12. The method of claim 1, further comprising:
    detecting an attempted creation of a node name for the storage device;
    suppressing the attempted creation of the node name for the storage device;
    recording the attempted node name;
    verifying the creation of the cache of the storage device; and creating a node name for the cache using the recorded attempted node name, wherein suppression of the attempted creation of the node name for the storage device and creation of the node name for the cache using the attempted created node name transparently redirects a user of the attempted node name to a cache of the storage device.

13. The method of claim 12 wherein the suppression of node name creation and the creation of a node name for the cache using the attempted node name occurs prior to execution of initialization scripts for a host of the storage device.

14. The method of claim 1, further comprising:
 detecting an attempted creation of a reference to the storage device;
 suppressing the attempted creation of the reference to the storage device;
 recording the attempted reference name;
 verifying the creation of the cache of the storage device; and
 creating a reference to the cache using the recorded attempted reference name, wherein suppression of the attempted creation of the reference to the storage device and creation of the reference to the cache using the attempted created reference name transparently redirects a user of the attempted reference to a cache of the storage device.

15. The method of claim 14, wherein the reference comprises a symbolic link.

16. An article of manufacture for managing cache configuration, the article of manufacture comprising:
 at least one non-transitory processor readable storage medium; and
 instructions stored on the at least one non-transitory processor readable storage medium;
 wherein the instructions are configured to be readable from the at least one non-transitory processor readable storage medium by at least one processor and thereby cause the at least one processor to operate so as to:
  determine a first unique identifier for a storage device;
  create a first rule to generate a first node name upon detection of the storage device having the first unique identifier;
  determine a second unique identifier for a cache device;
  create a second rule to generate a second node name upon detection of the cache device having the second unique identifier;
  create a third rule to generate a cache of the storage device using the cache device;
  detect a device and verify the identity of the device using a unique identifier associated with the device;
  in the event the storage device is detected, execute the first rule to generate the first node name;
  in the event the cache device is detected, execute the second rule to generate the second node name; and
  in the event the first node name and the second name exist, execute the third rule to generate the cache of the storage device using the cache device.

17. The article of manufacture of claim 16, wherein the instructions are further configured to execute and thereby cause the at least one processor to operate so as to:
 detect an attempted creation of a node name for the storage device;
 suppress the attempted creation of the node name for the storage device;
 record the attempted node name;
 verify the creation of the cache of the storage device; and
 create a node name for the cache using the recorded attempted node name, wherein suppression of the attempted creation of the node name for the storage device and creation of the node name for the cache using the attempted created node name transparently redirects a user of the attempted node name to a cache of the storage device.

18. The article of manufacture of claim 16, wherein the instructions are further configured to execute and thereby cause the at least one processor to operate so as to:
 detect an attempted creation of a reference to the storage device;
 suppress the attempted creation of the reference to the storage device;
 record the attempted reference name;
 verify the creation of the cache of the storage device; and
 create a reference to the cache using the recorded attempted reference name, wherein suppression of the attempted creation of the reference to the storage device and creation of the reference to the cache using the attempted created reference name transparently redirects a user of the attempted reference to a cache of the storage device.

19. The article of manufacture of claim 16, wherein in the event the cache device is not detected and the storage device is detected, the cache is enabled in a degraded mode.

20. The article of manufacture of claim 16, wherein the instructions are further configured to execute and thereby cause the at least one processor to operate so as to:
 detect the cache device subsequent to enablement of the cache in degraded mode; and
 enable the cache in a normal mode.

* * * * *